United States Patent [19]

Nikano

[11] Patent Number: 5,085,747
[45] Date of Patent: Feb. 4, 1992

[54] ULTRASONIC MACHINING METHOD

[76] Inventor: Akio Nikano, 14-1, Ichikawaminami 3-chome, Ichikawa-shi, Chiba-ken, Japan

[21] Appl. No.: 680,314

[22] Filed: Apr. 4, 1991

Related U.S. Application Data

[63] Continuation-in-part of Ser. No. 430,279, Oct. 31, 1989, Pat. No. 5,062,933.

[30] Foreign Application Priority Data

Nov. 27, 1990 [JP] Japan .................................. 2-326520

[51] Int. Cl.$^5$ ........................... B23H 3/08; B23H 7/38
[52] U.S. Cl. ................ 204/129.46; 204/129.7
[58] Field of Search ........... 204/129.46, 129.7, 129.75, 204/129.5

[56] References Cited

U.S. PATENT DOCUMENTS

| | | | |
|---|---|---|---|
| 4,125,444 | 11/1978 | Inoue | 204/129.46 X |
| 4,512,859 | 4/1985 | Inoue | 204/129.46 |
| 4,839,005 | 6/1989 | Katsumoto et al. | 204/129.46 |
| 4,900,409 | 12/1990 | Vunderink | 204/129.46 |
| 4,980,036 | 12/1990 | Saito et al. | 204/129.46 X |

FOREIGN PATENT DOCUMENTS 60-0204899 10/1985 Japan .............................. 204/129.46

*Primary Examiner*—Donald R. Valentine
*Attorney, Agent, or Firm*—Klauber & Jackson

[57] ABSTRACT

An ultrasonic machining method for mirror-finishing with an extremely high precision the surface of a workpiece by supplying an electrolyte and soft spheres, in combination or separately, to the electrolysis region between the tool of an ultrasonic machine and the workpiece which are positioned a certain distance apart. Being ultrasonically actuated, the soft spheres bring about the fluid lubrication which removes the passive state film which forms on the work surface of the workpiece as electrolysis proceeds. In addition, the soft spheres catches and bring away the residues of the passive state film removed, owing to its ionic attraction. Thus ultrasonic machining is achieved without any mechanical force (machining stress) applied to the work surface.

2 Claims, 8 Drawing Sheets

25μm

25μm

ULTRASONIC MACHINING METHOD

This application is a Continuation-in-Part application of prior U.S. patent application Ser. No. 430,279, filed on Oct. 31, 1989, in the name of Akio Nakano, and entitled "Ultrasonic Machining Method", now U.S. Pat. No. 5,062,933; and the entire disclosure of the noted prior patent application is hereby expressly incorporated by reference herein.

BACKGROUND OF THE INVENTION

1. Field of the Invention

The present invention relates to an ultrasonic machining method for mirror-finishing (polishing) the surface of a workpiece made of boride cermet or Ni(12.5)-Cr(20.5) rolled material, said workpiece having hard layers and comparatively soft metal binding layers mixed together.

2. Description of the Prior Art

Ultrasonic machining for polishing is usually accomplished by the impact action of hard abrasive grains placed between a workpiece and a tool attached to a vibrating horn of an ultrasonic machine. The impact action is induced by the ultrasonic vibration of the tool. The abrasive grains, which are made of meta-$B_4C$ or CBN, bring about minute brittle fracture in the work surface of the workpiece. In other words, ultrasonic machining resorts on the mechanical removal of material from a workpiece which is achieved by the direct application of mechanical force (machining stress) to a workpiece. Therefore, the machining precision of the finished surface is no better than that achieved by mechanical machining which also has a limitation.

In order to improve the precision of finishing, there was devised and proposed an ultrasonic machining method combined with electrochemical machining. According to this method, an electrolyte containing hard abrasive grains is placed between a workpiece and a tool and an electric current is applied across them for electrochemical machining. (See Japanese Patent Laid-open No. 282821/1987.)

This new ultrasonic machining method combined with electrochemical machining provides a higher finish precision than the conventional ultrasonic machining. Nevertheless, it still has a disadvantage that it leaves strain in the workpiece because it achieves machining by the impact of hard abrasive grains against the workpiece or by the mechanical force directly applied to the workpiece. Therefore, it is not yet satisfactory for mirror finishing which needs an extremely high precision.

There is known a machining method for mirror finish which is a combination of electrolytic machining and grinding with abrasive grains. Grinding is intended to remove the passive oxide film which is formed by electrolysis on the work surface of the workpiece as electrolysis proceeds (for the removal of material by chemical process). (Refer to Japanese Patent Laid-open No. 1395/1978.) This conventional machining process is carried out with an apparatus consisting of a workpiece holder and a tool which faces to the workpiece and slides parallel to the work surface of the workpiece. The tool is provided with electrodes and buffs arranged alternately. The buffs press and rub abrasive grains against the work surface. To achieve electrolytic machining, an electrolyte containing irregularly shaped hard abrasive grains suspended therein is passed through the gap between the tool and the work surface. Electrolytic machining forms a film on the work surface, and this film is removed by buffing. Thus buffing promotes electrolytic machining and permits the minute projections on the work surface to undergo electrolytic machining preferentially. In this way, the work surface undergoes mirror finishing.

A disadvantage of this machining method is that the hard abrasive grains suspended in the electrolyte cause strain to the work surface when they remove the film formed on the work surface as the result of electrolysis. One reason for this disadvantage is that it is difficult to control the pressure of the tool according to the thickness of the film to be removed because the tool presses hard abrasive grains against the work surface to remove the film. Another reason is that the abrasive grains are irregularly shaped and are made of hard material so that they apply a mechanical force (machining stress) to the workpiece.

Because of these disadvantages, the conventional machining method does not meet the requirements for mirror finish with an extremely high precision which have arisen with the recent technological development. For example, the cavity of a die cast mold, into which a high-temperature molten metal is injected, should have a mirror finish of extremely high precision so that it gives a molded item having a good surface and a high dimensional accuracy.

SUMMARY OF THE INVENTION

The present invention was completed in view of the circumstances mentioned above. Accordingly, it is an object of the present invention to provide an ultrasonic machining method for mirror-finishing with extremely high precision the surface of a workpiece by constant electrolytic action (to remove material chemically) using an electrolyte, while effectively removing the passive oxide film which forms on the work surface as the electrolytic machining proceeds for the removal of material from the work surface by the electrolyte, in particular, effectively and preferentially removing the passive oxide film which forms on the projections of the work surface, without giving any mechanical force (machining stress) to the work surface.

Figure 1:
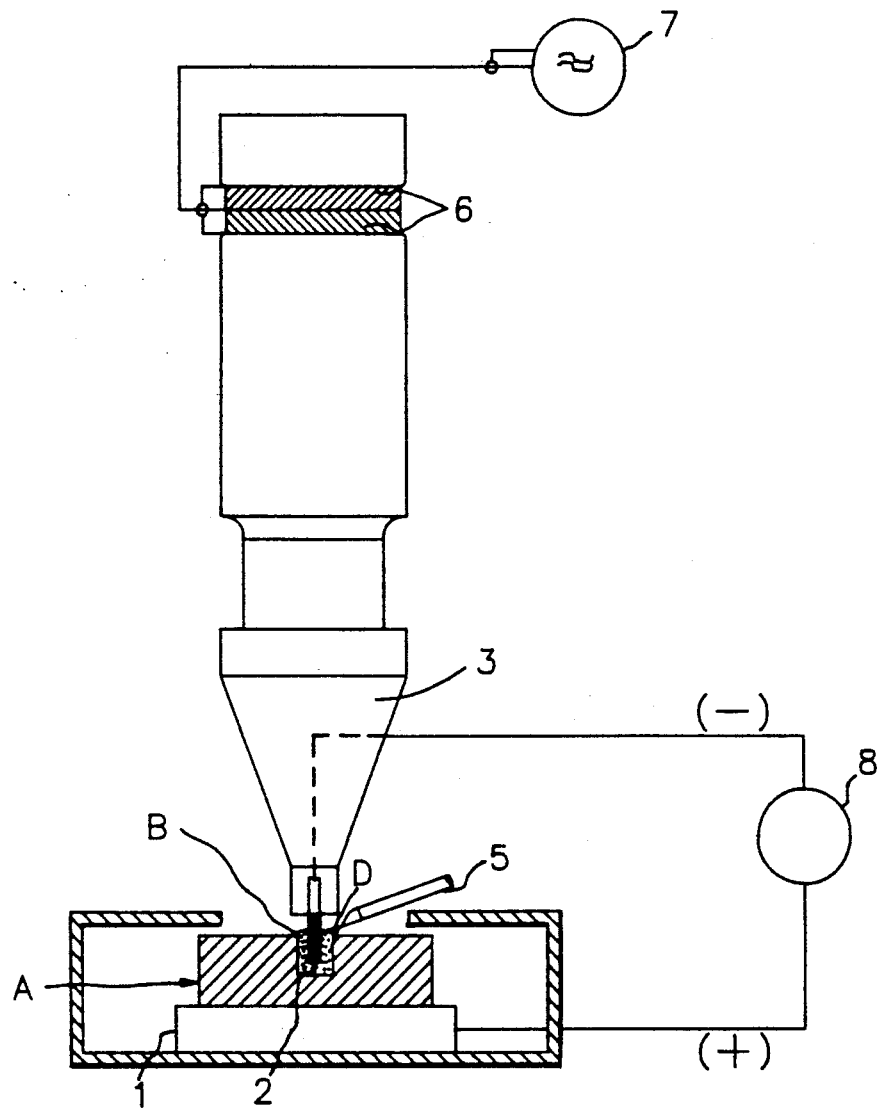
FIG. 1 is a schematic diagram showing one embodiment of the ultrasonic machining method pertaining to the first claim of the present invention.
Figure 2:
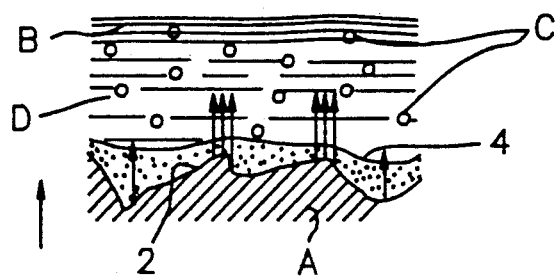
FIG. 2 is a partly enlarged view showing the electrolysis region between the work surface and the tool.

The following reference characters are used in the figures.

A : Workpiece, B : Tool, C : Soft spheres, C : Core, C$_2$: Shell, D : Electrolyte, 2 : Work surface, and 4 : Passive state film.

DESCRIPTION OF THE PREFERRED EMBODIMENTS

The first aspect of the present invention is embodied in an ultrasonic machining method which comprises applying an electric current across the electrolysis region between a workpiece and a tool of an ultrasonic machine which are positioned a certain distance apart, while supplying said electrolysis region at a prescribed flow rate with an electrolyte containing soft spheres made of a polymeric material and composed of the core and shell which differ in molecular weight, having a particle diameter of 0.5-2.5 $\mu$ and a specific gravity which permits them to suspend in the electrolyte when immersed therein, and ultrasonically vibrating the tool in the direction perpendicular to the flow direction, thereby promoting the rotary motion of the soft spheres rotatingly moving together with the electrolyte and causing the soft spheres to approach the passive state film which forms on the work surface and to give a grinding action to the passive state film for its removal by the extremely small elastic breakage, and causing the soft spheres to catch the residue of the passive state film by the ionic attracting action that occurs on their surface and discharging the electrolyte and soft spheres from the electrolysis region.

The second aspect of the present invention is embodied in an ultrasonic machining method which comprises applying an electric current across the electrolysis region between a workpiece and a tool of an ultrasonic machine which are positioned a certain distance apart, while separately supplying at a prescribed flow rate said electrolysis region with an electrolyte and soft spheres made of a polymeric material and composed of the core and shell which differ in molecular weight, having a particle diameter of 0.5-2.5 $\mu$ and a specific gravity which permits them to suspend in the electrolyte when immersed therein, and ultrasonically vibrating the tool in the direction perpendicular to the flow direction, thereby promoting the rotary motion of the soft spheres rotatingly moving together with the electrolyte and causing the soft spheres to approach the passive state film which forms on the work surface and to give a grinding action to the passive state film for its removal by the extremely small elastic breakage, and causing the soft spheres to catch the residue of the passive state film by the ionic attracting action that occurs on their surface and discharging the electrolyte and soft spheres from the electrolysis region.

According to the first aspect of the present invention, ultrasonic machining is carried out in the following manner. A workpiece is placed a certain distance away from a tool of an ultrasonic machine. The electrolysis region between the workpiece and the tool is supplied at a prescribed flow rate with an electrolyte containing soft spheres. With the electrolyte flowing, an electric current is applied across the workpiece and the tool to perform the machining of the work surface by electrolysis. Simultaneously, the tool is ultrasonically vibrated in the direction perpendicular to the flow of the electrolyte, so that the ultrasonic vibration gives a rapid rotary motion to the soft spheres which are suspending in the electrolyte and rotatingly moving together with the electrolyte and causes the soft spheres to approach the passive state film which forms on the work surface as electrolytic machining proceeds. The soft spheres give a grinding action to the passive state film, especially one which forms on the projections of the work surface, for its removal by the extremely small elastic breakage. To be more specific, the rapidly rotating soft spheres that approach the passive state film bring about the fluid lubrication between the soft spheres and the passive state film. This fluid lubrication removes the passive state film by minute elastic breakage and catches by attraction the residues of the passive state film. Finally, the electrolyte together with the soft spheres are discharged from the electrolysis region. In this way, the passive state film is broken and removed without the application of mechanical force (machining stress) to the work surface. The use of soft spheres prevents electrolysis from being hindered by the passive state film and hence promotes electrolysis, thereby permitting the mirror finishing of the work surface.

According to the second aspect of the present invention, ultrasonic machining for mirror finishing is carried out in the similar way to that mentioned above, except that the electrolyte and the soft spheres are separately supplied (for subsequent mixing) at a prescribed flow rate to the electrolysis region between the work surface and the ultrasonically vibrating tool which are positioned a certain distance apart.

EXAMPLES

The first aspect of the present invention will be described by reference to FIG. 1 (showing an embodiment as defined by the first claim). There is shown a workpiece (A) which is made of boride cermet such as MoB-Ni-Mo or Ni(12.5)–Cr(20.5) rolled material. The workpiece (A) is placed on the table (1) of an ultrasonic machine. The ultrasonic machine has a vibrating horn (3), to which is attached a tool (B). The tool (B) is positioned a certain distance away from the work surface of the workpiece (A). The electrolysis region between the work surface (2) and the tool (B) is supplied with an electrolyte (D) at a prescribed flow rate. The electrolyte (D) contains soft spheres (C). With the electrolyte flowing, an electric current is applied across the electrolysis region, so as to perform electrolytic machining by electrolysis. The electrolytic machining removes the material from the work surface (2) of the workpiece (A). Simultaneously with the electrolytic machining, the tool (B) ultrasonically vibrates in the direction perpendicular to the flow direction. This vertical ultrasonic vibration promotes the rotary motion of the soft spheres (C) rotatingly moving together with the electrolyte (D) passing through the electrolysis region. The actuated soft spheres (C) approach the passive state film (4) which forms on the work surface (2) as the electrolytic machining proceeds, and then they give a grinding action to the passive state film (4) for its removal by extremely small elastic breakage. In addition, the soft spheres (C) attract the residues of the passive state film (4). Finally, the electrolyte (D) and soft spheres (C) are discharged from the electrolysis region. In this way, the work surface (2) undergoes mirror-finishing (polishing).

Figure 5:
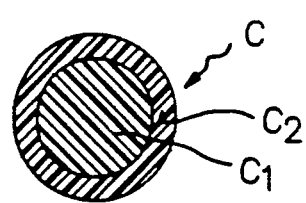

The above-mentioned soft spheres (C) are made of a polymeric material, and they have a specific gravity which permits them to suspend in the electrolyte (D) when they are immersed therein. The polymeric material is polyamide MXD6 (m-xylylenediamine MXDA + adipic acid) or the like if the workpiece (A) is one which is made of boride cermet (MoB-Ni-Mo), and the polymeric material is acrylic resin or nylon if the workpiece (A) is one which is made of Ni(12.5)-Cr(20.5) rolled material. Each particle of the soft spheres is composed of a core ($C_1$) and a shell ($C_2$) which differ in molecular weight from each other. Each particle of the soft spheres has a particle diameter of about 0.5-2.5 $\mu$. (See FIG. 5.) In this example, the core ($C_1$) should have a lower molecular weight than the shell ($C_2$) by 70,000-90,000.

Figure 4:
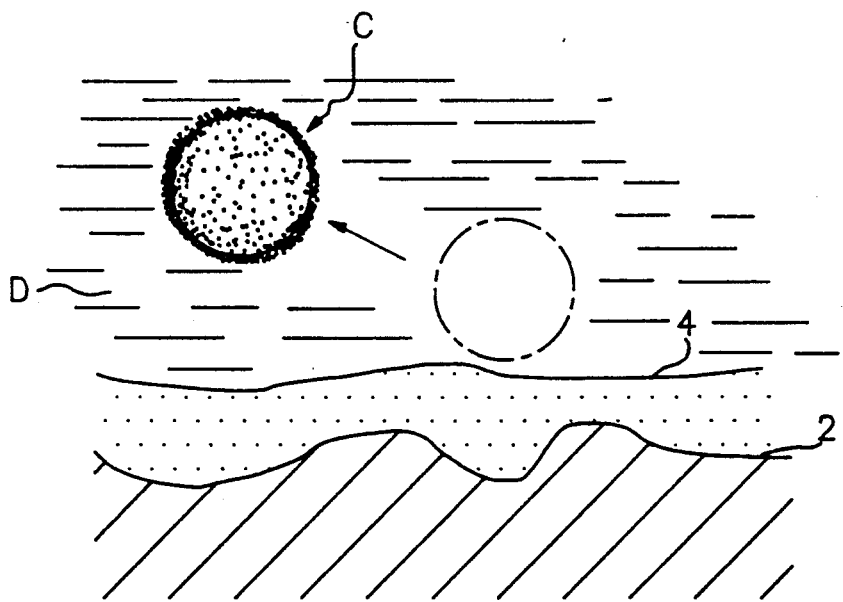

The difference in molecular weight for the core ($C_1$) and shell ($C_2$) is responsible for the ionic attracting action (by anionic charges and functional groups). This ionic attracting action catches the residues of the passive state film (4) after its breakage by the soft spheres (C) actuated by ultrasonic motion. (See FIG. 4.)

Figure 6:
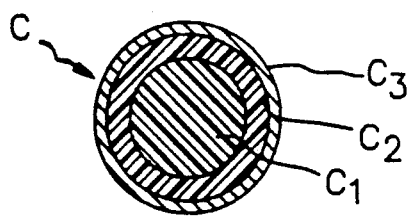
FIGS. 5 and 6 are sectional views showing the soft spheres.

Each particle of the soft spheres (C) has a surface layer ($C_3$) of Mo-Ni-Co, Nd-Fe-B, Nd, or Ti, which is formed by sputtering or EB deposition, as shown in FIG. 6. The surface layer ($C_3$) is useful to establish a desired specific gravity which permits the soft spheres to suspend in the electrolyte (D) according to its concentration. In addition, the surface layer ($C_3$) makes the soft spheres (C) resilient so that they rebound from the tool (B).

Incidentally, the surface layer ($C_3$) should preferably be formed in the case where the soft spheres are made of nylon, because nylon is less resilient than acrylic resin and presents difficulty in establishing a desired specific gravity for the electrolyte (D). The soft spheres (C) with the surface layer ($C_3$) should also have a particle diameter of about 0.5-2.5 $\mu$.

For the initial stage of machining in which the work surface (2) has great irregularities, it is desirable to use the soft spheres (C) having a particle diameter of about 2.5 $\mu$. As the machining proceeds and the work surface becomes flat, it is desirable to reduce the particle diameter gradually. For the final stage of machining, it is desirable to use the soft spheres (C) having a particle diameter of about 0.5 $\mu$.

The electrolyte (D) which contains the soft spheres (C) should be composed of 1 part of 60% perchloric acid ($HClO_4$), 10 parts of 100% methanol ($CH_3OH$), and 6 parts of butyl cellosolve (ethylene glycol monobutyl ether $CH_3(CH_2)_2CH_2OCH_2CH_2OH$), if the workpiece (A) is one which is made of boride cermet (MoB-Ni-Mo). Also it should be composed of 1 liter of pure water ($H_2O$), 12 g of $Na_2S_2O_3$, 2 g of $SC(NH_2)_2$, and 1 g of $CuNO_3$, if the workpiece (A) is one which is made of Ni(12.5)-Cr(20.5) rolled material. The electrolyte is supplied at a prescribed flow rate to the electrolysis region between the tool (B) and the work surface (2) of the workpiece (A), by means of the electrolyte feeder (5) which is connected to an electrolyte reservoir via a feed pump (both not shown).

The ultrasonic machine used in this example has a piezoelectric transducer (6) of zirconia sintered body connected to an oscillator (7). The piezoelectric transducer (6) produces ultrasonic vibration with an amplitude 21±1.5 $\mu$ in a high-frequency range of 15~30±5 kHz and with an amplitude of 24±2 $\mu$ in a low-frequency range of 2~15±18 kHz. In other words, the ultrasonic machine is capable of generating ultrasonic vibration over a broad range of frequencies. The electrolyte (D) reacts with the work surface (2) of the workpiece (A) in such a manner that the passive state film (4) is constantly formed by electrolysis on the work surface (2) of the workpiece (A). The electric current for electrolysis is applied across the tool (B) and the work surface (2) by the electric current generator (8) connected to the tool (B) and the table (1) on which the workpiece (B) is placed, with the tool (B) being a cathode (−) and the table (1) being an anode (+).

The ultrasonic machining method (referred to as the present method hereinafter) in this example is carried out in the following manner. On the table (1) of the ultrasonic machine is placed a workpiece (A) which has undergone rough machining such as electric discharge machining. The tool (B) of the ultrasonic machine is positioned a certain distance away from the work surface (2) of the rough-machined workpiece (A). To the electrolysis region between the tool (B) and the work surface (2) is supplied at a prescribed flow rate the electrolyte (D) containing the soft spheres (C). The current generator (8) applies an electric current across the electrolysis region and, simultaneously, the vibrating horn (3) ultrasonically vibrates the tool (B).

Figure 3:
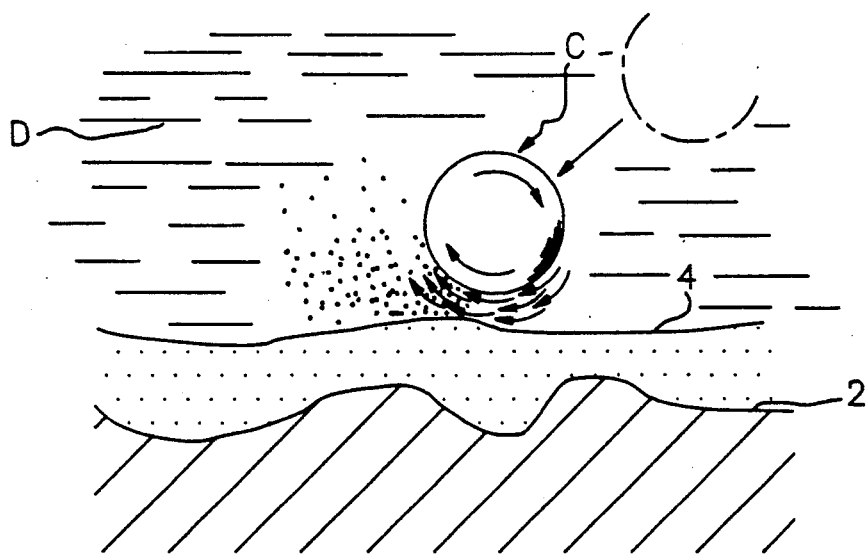
FIGS. 3 and 4 are enlarged schematic diagrams showing how the film is removed by the soft spheres.

The material of the work surface (2) of the rough-machined workpiece (A) is removed by electrolysis. Thus the workpiece undergoes electrolytic machining. At the same time, the soft spheres (C) rotatingly move, together with the flow of the electrolyte (D), across the electrolysis region. As they move, their rotary motion is promoted by the flow of the electrolyte (D) and the vertical vibration of the tool (B). Being given the downward and rapid rotary motion, the soft spheres (C) approach the passive state film (4) which forms on the work surface (2) as the electrolytic machining proceeds. When the soft spheres (C) approach most the passive state film (4), the distance between them is about 10-30 Å. (See FIG. 3.) Under such a situation, fluid lubrication (which is a hydrodynamic pressure exerting on the passive state film) occurs between the soft spheres (C) and the passive state film (4). This fluid lubrication induces minute elastic breakage, which causes the passive state film (4) to be preferentially removed from the projections of the work surface (2). The preferential removal of the passive state film (4) from the projections is possible only when the soft spheres (C) have a specific gravity which permits them to suspend in the electrolyte (D) when immersed therein and the tool (B) ultrasonically vibrates in the vertical direction over a broad frequency range. The residues of the passive stage film (4) remaining after breakage are caught by the soft spheres (C) with ionic attraction (by negative charge and functional groups) that occurs on the surface of the soft spheres (C). Finally, the soft spheres (C) are discharged, together with the continuously supplied electrolyte (D), from the electrolysis region between the tool (B) and the work surface (2). (See FIG. 4.)

EXAMPLE 1

Ultrasonic machining was carried out under the following conditions.
(a) Material of the workpiece: MoB-Ni-Mo
(b) Area of machining (electropolishing): 20 cm$^2$
(c) Voltage for electrolysis: 56 V
(d) Electric current for electrolysis: 20 A
(e) Flow rate of electrolyte: 500 mL/min, at 17° C.
(f) Ultrasonic frequency (max): 21.5 kHz
(g) Distance between the tool and workpiece: 50 μ
(h) Content of soft spheres in electrolyte: 17%

Figure 10:
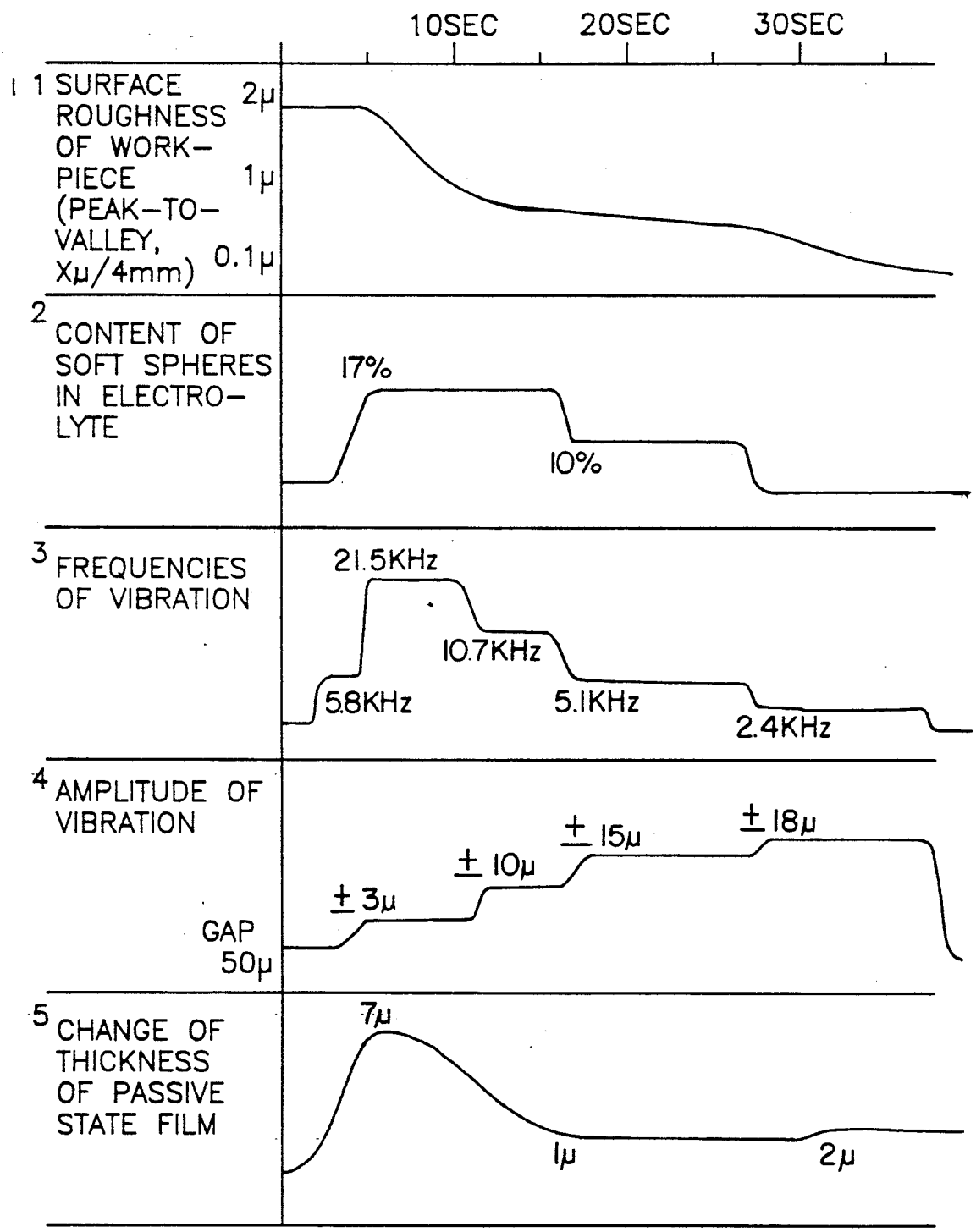
FIG. 10 is a graphic depiction of the characteristics of ultrasonic machining of MOB cermet material by the present method.

The ultrasonic machining mentioned above achieved mirror finish with a high surface precision of 0.1 μ/4 mm in a machining time of 30 seconds, as shown in the accompanying FIG. 10.

The ultrasonic machining for MoB-Ni-Mo material was carried out, with the content of the soft spheres (C) in the electrolyte, the frequency and amplitude of the tool (B), and the distance between the tool (B) and the work surface (2) changed according to the progress of ultrasonic machining, as shown in the accompanying FIG. 10.

EXAMPLE 2

Ultrasonic machining was carried out in the same manner as in Example 1 under the following conditions.
(a) Material of the workpiece: Ni(12.5)-Cr(20.5) rolled material
(b) Area of machining (electropolishing): 20 cm
(c) Voltage for electrolysis: 4.8 V
(d) Electric current for electrolysis: 1.7 A
(e) Flow rate of electrolyte 500 mL/min, at 20° C.
(f) Ultrasonic frequency (max): 20 kHz
(g) Distance between the tool and workpiece: 20 μ
(h) Content of soft spheres in electrolyte: 2%

Figure 11:
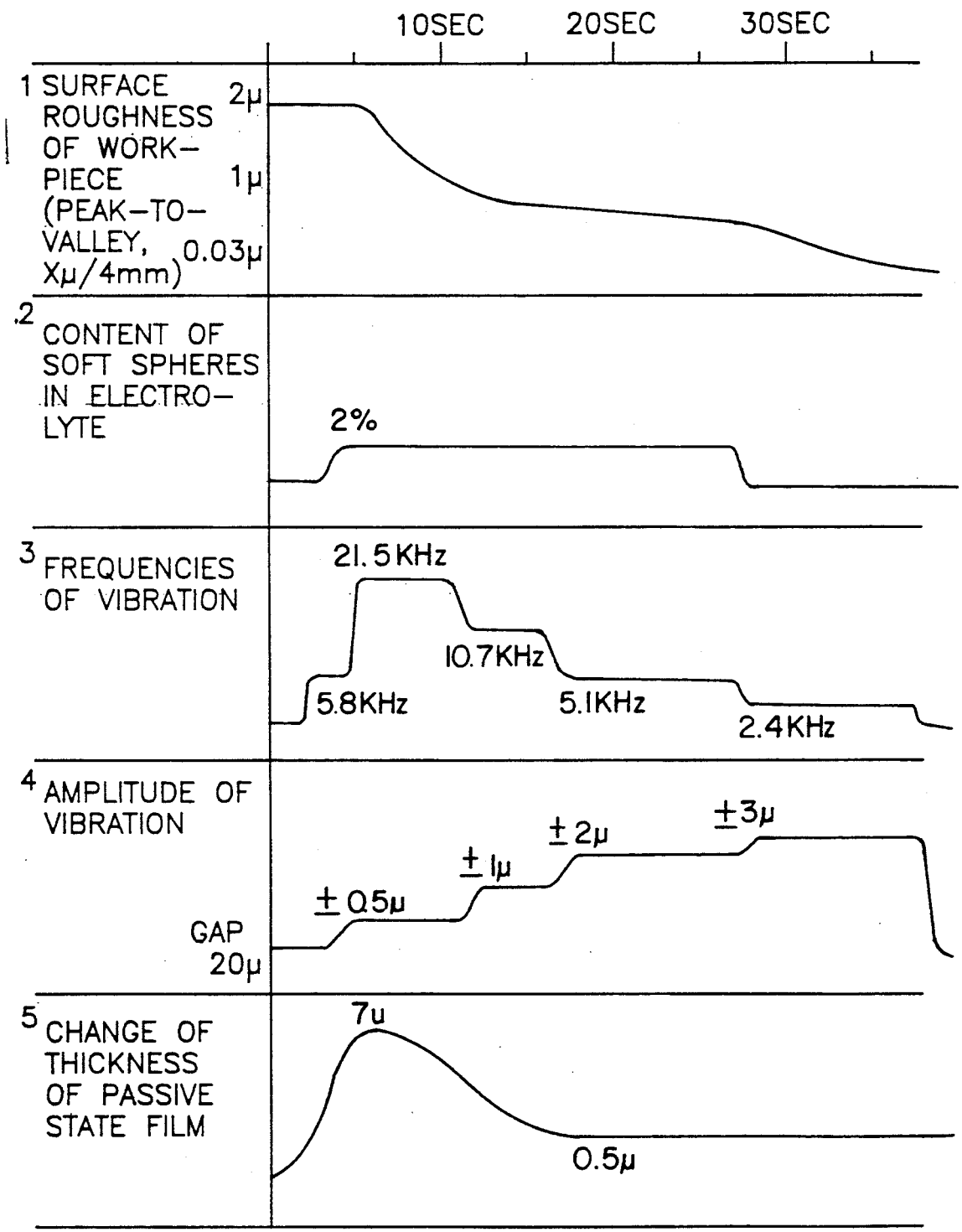
FIG. 11 is a graphic depiction of the characteristics of ultrasonic machining of Ni2.5-Cr20.5 rolled material by the present method.

The ultrasonic machining mentioned above achieved mirror finish with a high surface precision of 0.03 μ/4 mm in a machining time of 30 seconds, as shown in the accompanying FIG. 11.

The ultrasonic machining for Ni(12.5)-Cr(20.5) rolled material was carried out, with the frequency and amplitude of the tool (B) and the distance between the tool (B) and the work surface (2) changed according to the progress of ultrasonic machining, as shown in the accompanying FIG. 11.

Figure 7:
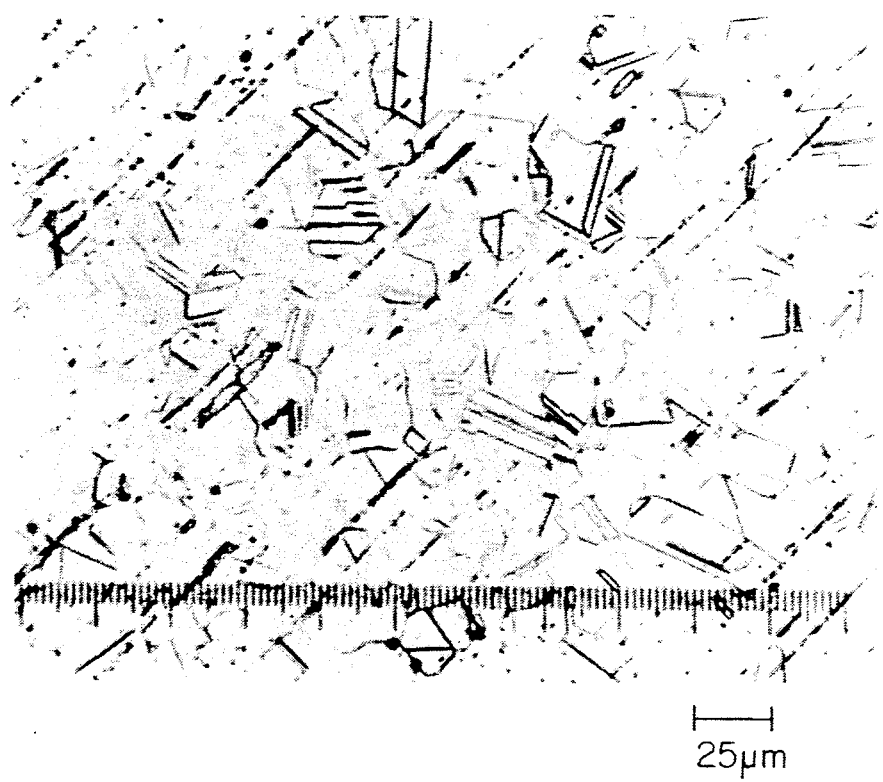
FIG. 7 is a photograph showing the structure of the work surface of Ni(12.5)-Cr(20.5) rolled material which has undergone ultrasonic machining according to the method of the present invention.
Figure 8:
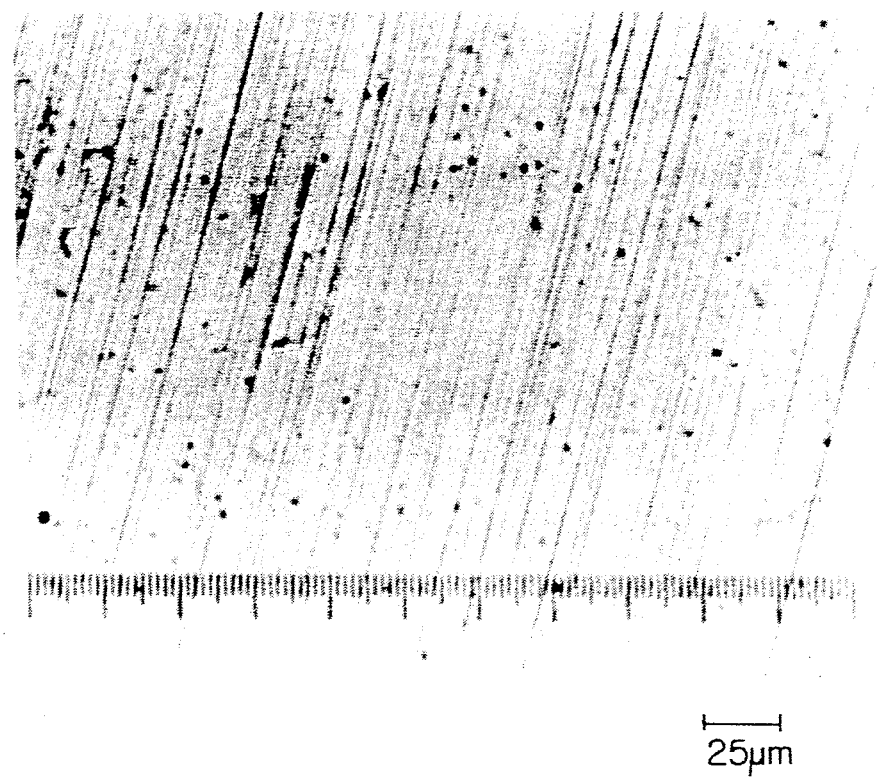
FIG. 8 is a photograph showing the structure of the work surface of Ni(12.5)-Cr(20.5) rolled material which has undergone ultrasonic machining according to the conventional method.
Figure 12:
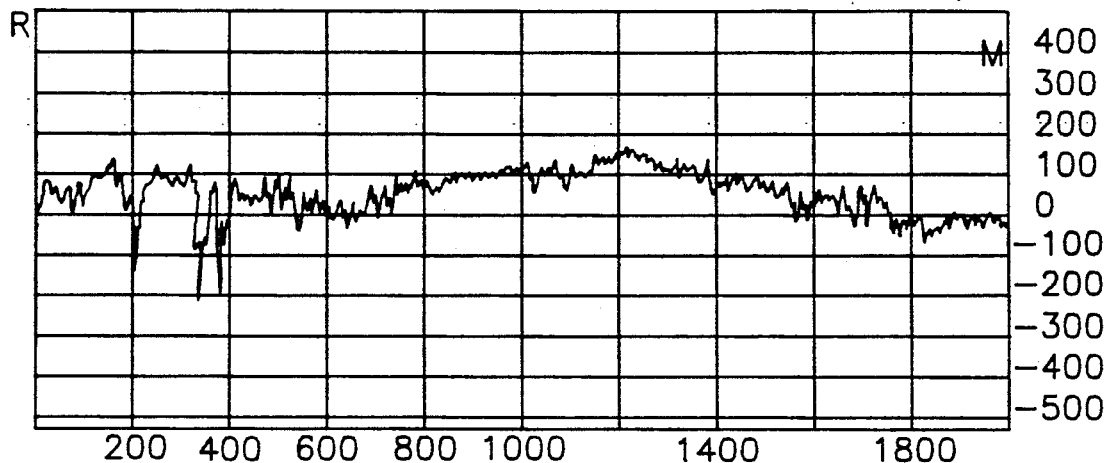
FIG. 12 is a graphic depiction of the characteristics of ultrasonic machining of Ni2.5 - Cr20.5 rolled material by the present method.
Figure 13:
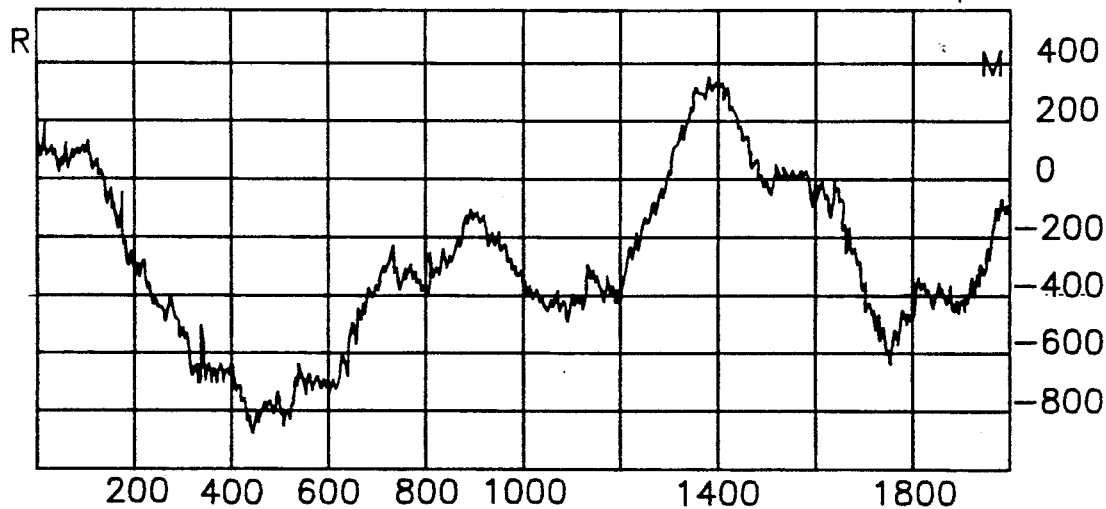
FIG. 13 is a graphic depiction of the characteristics of ultrasonic machining of Ni2.5 - Cr20.5 rolled material by the conventional method.

The advantage of the present method is obvious from the comparison between the surface precision of the Ni(12.5)-Cr(20.5) rolled material finished under the conditions of the example and the surface precision of the Ni(12.5)-Cr(20.5) rolled material finished by the conventional method (as disclosed in Japanese Patent Laid-open No. 1395/1977). The product finished by the present method has a high surface precision of 364 Å (peak-to-valley) as shown by the profile chart in the accompanying FIG. 12. By contrast, the product finished by the conventional method merely has a surface precision of 1250 Å (peak-to-valley) as shown in the profile chart in the accompanying FIG. 13. In addition, the Ni(12.5)-Cr(20.5) rolled material finished by the present method has no residual strains due to machining, as indicated by the photograph of surface metal structure in FIG. 7. By contrast, the Ni(12.5)-Cr(20.5) rolled material finished by the conventional method has strains (scratches) due to machining, as indicated by the photograph of surface metal structure in FIG. 8.

The above-mentioned results indicate that the present method is effective for the extremely high precision mirror finish of the work surface (2) of the workpiece (A) which can be performed efficiently chiefly by electrolytic machining without the application of mechanical force (machining stress) to the work surface (2). This advantage derives from the use of soft spheres (C) in combination with the electrolyte (D). The soft spheres (C) have a specific gravity which permit them to suspend in the electrolyte when dispersed therein. Suspending in the electrolyte (D), the soft spheres (C) rotatingly move as the electrolyte (D) passes through the electrolysis region. The rotary motion of the soft spheres (C) is promoted by the tool (B) which ultrasonically vibrates in the vertical direction over a broad variable range of frequency. The rapidly rotating soft spheres (C) approach (as close as 10–30 Å) the passive state film (4) which forms on the work surface (2) of the workpiece (A) as electrolysis proceeds. The approach of the rapidly rotating soft spheres (C) brings about the fluid lubrication between the soft spheres (C) and the passive state film (4). The fluid lubrication removes the passive state film (4) by minute elastic breakage, without contact by the soft spheres. The removal of the passive state film (4) prevents electrolysis from being hindered by the passive state film (4) and permits electrolysis to proceed constantly. This leads to the accelerated mirror finishing of the workpiece.

Figure 9:
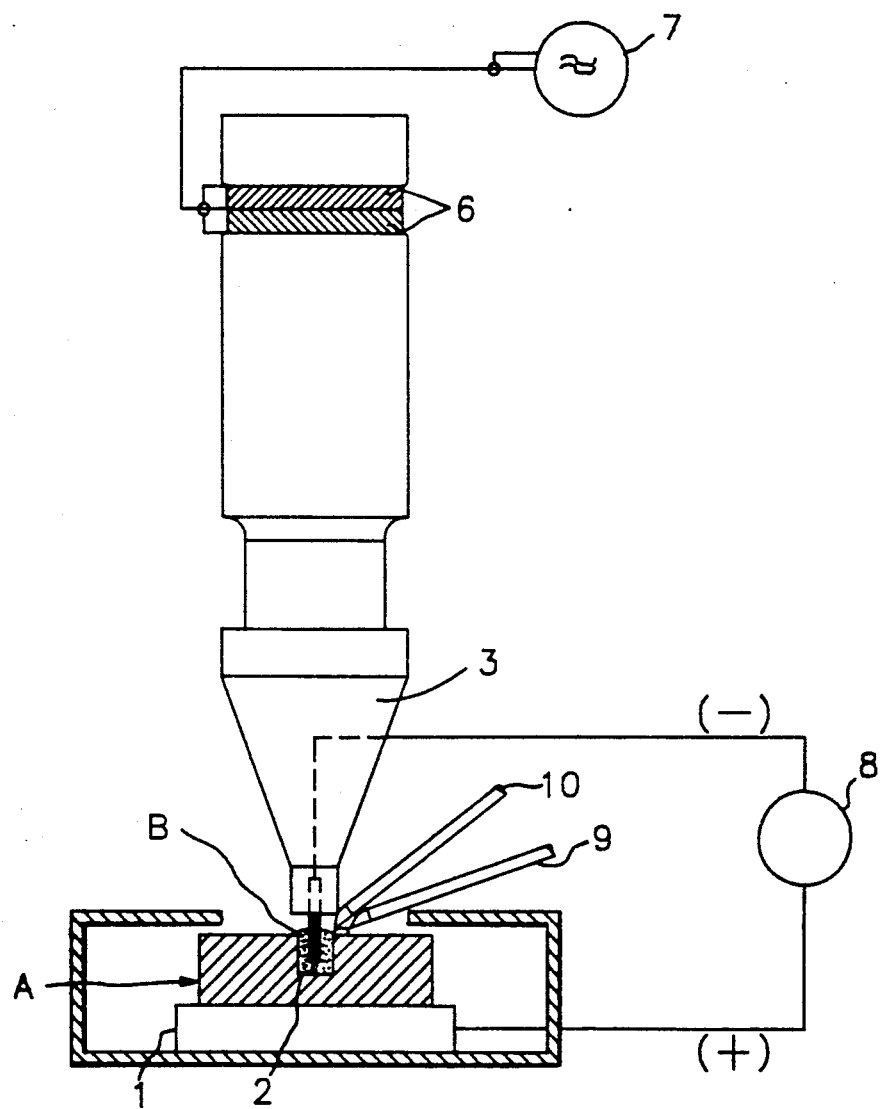
FIG. 9 is a schematic diagram showing one embodiment of the ultrasonic machining method pertaining to the second claim of the present invention.

An embodiment pertaining to the second claim of the present invention is shown in FIG. 9. The basic construction of this embodiment is identical with that of the above-mentioned embodiment pertaining to the first claim of the present invention. Like reference characters designate like or corresponding parts in FIGS. 1 and 9. There is shown a first feeder (9) to supply the electrolyte (D) to the electrolysis region between the tool (B) and the work surface (2) of the workpiece (A). There is also shown a second feeder (10) to supply the soft spheres (C) to the above-mentioned electrolysis region. The soft spheres (C) are mixed into the electrolyte (D) in the above-mentioned electrolysis region. The first feeder (9) for the electrolyte is connected to an electrolyte reservoir via a feed pump (both not shown). The second feeder (10) for the soft spheres is connected to a hopper to store the soft spheres via a transfer means such as a transfer fan (both not shown).

The present method pertaining to the second claim also offers an advantage which derives from the use of the soft spheres (C) in combination with the electrolyte (D). The soft spheres (C) ar supplied from the feeder (10) to the electrolysis region between the tool (B) and the work surface (2) of the workpiece, while the electrolyte (D) is being supplied from the feeder (9) at a prescribed flow rate to the electrolysis region. The soft spheres (C) are mixed into the electrolyte (D). The resulting mixture takes part in the mirror finishing of the work surface (2) of the workpiece (A) by electrolytic machining. The tool (B) promotes the rotary motion of the soft spheres (C) and causes the soft spheres (C) to approach the passive state film (4) which forms of the work surface (2) of the workpiece (A) as electrolysis proceeds. The soft spheres (C) remove the passive state film (4) by minute elastic breakage and catch by attraction the residues of the passive state film (4) thus removed. Finally, the soft spheres (C) are discharged from the electrolysis region as the electrolyte (D) flows out. In this way, the present method permits mirror finish by electrolysis while preventing electrolysis from being hindered by the passive state film (4).

Supplying the electrolyte (D) and the soft spheres (C) separately to the electrolysis region between the tool (B) and the work surface (2) of the workpiece (A) offers an advantage of efficient machining and easy operation. In the initial stage of machining in which there are many projections on the work surface (2), it is possible to increase the machining efficiency by supplying the soft spheres (C) having a large particle diameter. In the later stage of machining in which the work surface (2) is almost flat, it is desirable to supply the soft spheres (C) having a small particle diameter. Thus, the separate supply makes it possible to easily change the supply pattern and the mixing ratio of the electrolyte (D) and the soft spheres (C).

In the above-mentioned embodiment, the feeder (9) for the electrolyte and the feeder (10) for the soft spheres are arranged separately. Alternatively, they may be combined to form a feeder having one outlet and two branched inlets. This feeder permits the mixing of the electrolyte (D) and the soft spheres (C) in it before the mixture is delivered to the electrolysis region between the tool (B) and the work surface (2) of the workpiece (A).

EFFECTS OF THE INVENTION

The ultrasonic machining method of the present invention produces the following effects owing to its constitution mentioned above.

(1) The ultrasonic machining is achieved by applying an electric current across the electrolysis region between a workpiece and a tool of an ultrasonic machine which are positioned a certain distance apart, while supplying said electrolysis region at a prescribed flow rate with an electrolyte containing soft spheres made of a polymeric material and composed of the core and shell which differ in molecular weight, having a particle diameter of 0.5-2.5 $\mu$m and a specific gravity which permits them to suspend in the electrolyte when immersed therein, and ultrasonically vibrating the tool in the direction perpendicular to the flow direction, thereby promoting the rotary motion of the soft spheres rotatingly moving together with the electrolyte and causing the soft spheres to approach the passive state film which forms on the work surface. The soft spheres which are caused to rotate rapidly and approach the passive state film by the tool bring about the fluid lubrication between the passive state film and the soft spheres. The fluid lubrication removes, by minute elastic breakage without contact by the soft spheres, the passive state film which forms on the work surface of the workpiece as electrolysis proceeds in the electrolysis region. In addition, it is possible to control the momentum of the soft spheres by changing the amplitude of the ultrasonic vibration, and it is also possible to control the electrolytic reaction.

Therefore, the present method makes it possible to remove effectively and preferentially the passive state film which forms on the projections of the work surface as electrolysis proceeds. The removal of the passive state film is achieved without mechanical force (machining stress) applied to the work surface. The electrolytic machining coupled with the removal of the passive state film permits the mirror finishing with an extremely high precision which has never been achieved by the conventional method.

(2) Each particle of the soft spheres is made of a polymeric material and is composed of the core and shell which differ in molecular weight, with the core having a lower molecular weight than the shell. The core-shell structure gives rise to the ionic attracting action which catches the residues of the passive state film removed by minute elastic breakage from the work surface of the workpiece. Thus the soft spheres function as the carrier which discharge the residues of the passive state film as the electrolyte leaves the electrolysis region, thereby keeping clean the electrolyte in the electrolysis region.

(3) The ultrasonic machining is carried out by separately supplying the electrolyte and the soft spheres to the electrolysis region between the tool and the work surface of the workpiece. Therefore, this method offers, in addition to the same advantages in (1) and (2) above, another advantage of efficient machining and easy operation. That is, in the initial stage of machining in which there are many projections on the work surface, it is possible to increase the machining efficiency by supplying the soft spheres having a large particle diameter. In the later stage of machining in which the work surface is almost flat, it is desirable to supply the soft spheres having a small particle diameter. Thus, the separate supply makes it possible to easily change the supply pattern and the mixing ratio of the electrolyte and the soft spheres.

What is claimed is:

1. An ultrasonic machining method which comprises applying an electric current across the electrolysis region between a workpiece and a tool of an ultrasonic machine which are positioned a certain distance apart, while supplying said electrolysis region at a prescribed flow rate with an electrolyte containing soft spheres made of a polymeric material and composed of the core and shell which differ in molecular weight, having a particle diameter of 0.5-2.5 $\mu$ and a specific gravity which permits them to suspend in the electrolyte when immersed therein, and ultrasonically vibrating the tool in the direction perpendicular to the flow direction, thereby promoting the rotary motion of the soft spheres rotatingly moving together with the electrolyte and causing the soft spheres to approach the passive state film which forms on the work surface and to give a grinding action to the passive state film for its removal by the extremely small elastic breakage, and causing the soft spheres to catch the residue of the passive state film by the ionic attracting action that occurs on their surface and discharging the electrolyte and soft spheres from the electrolysis region.

2. An ultrasonic machining method which comprises applying an electric current across the electrolysis region between a workpiece and a tool of an ultrasonic machine which are positioned a certain distance apart, while separately supplying at a prescribed flow rate said electrolysis region with an electrolyte and soft spheres made of a polymeric material and composed of the core and shell which differ in molecular weight, having a particle diameter of 0.5-2.5$\mu$ and a specific gravity which permits them to suspend in the electrolyte when immersed therein, and ultrasonically vibrating the tool in the direction perpendicular to the flow direction, thereby promoting the rotary motion of the soft spheres rotatingly moving together with the electrolyte and causing the soft spheres to approach the passive state film which forms on the work surface and to give a grinding action to the passive state film for its removal by the extremely small elastic breakage, and causing the soft spheres to catch the residue of the passive state film by the ionic attracting action that occurs on their surface and discharging the electrolyte and soft spheres from the electrolysis region.

* * * * *

UNITED STATES PATENT AND TRADEMARK OFFICE
CERTIFICATE OF CORRECTION

PATENT NO. : 5,085,747

DATED : FEBRUARY 4, 1992

INVENTOR(S) : AKIO NAKANO

It is certified that error appears in the above-identified patent and that said Letters Patent is hereby corrected as shown below:

On the Title Page, item [19] and [76] "Nikano" should be changed to --Nakano--.

Signed and Sealed this

Twenty-seventh Day of April, 1993

*Attest:*

MICHAEL K. KIRK

*Attesting Officer*         *Acting Commissioner of Patents and Trademarks*